Jan. 8, 1929.
F. H. OWENS
1,698,105
MOTION PICTURE APPARATUS
Filed Dec. 24, 1925
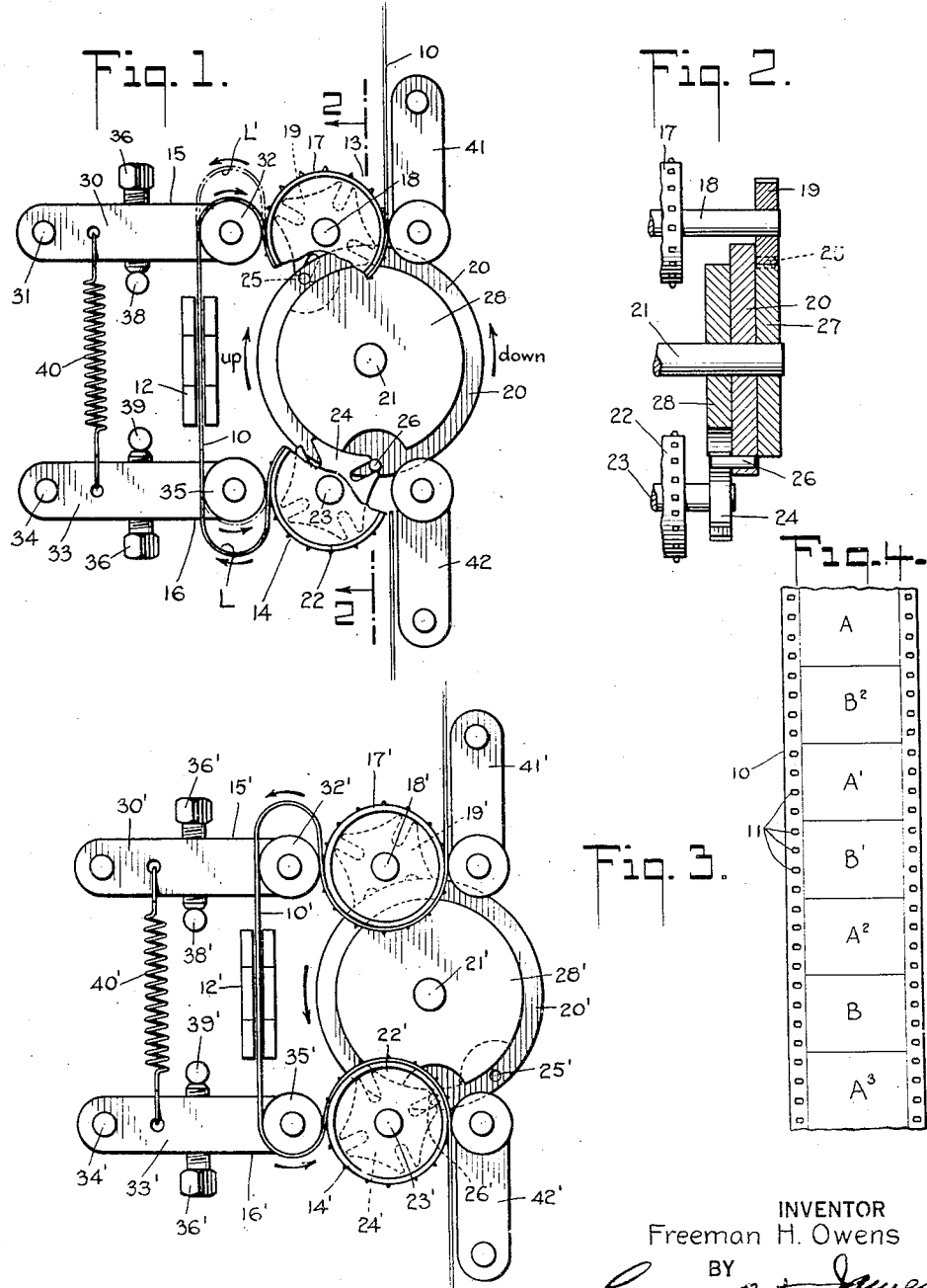
INVENTOR
Freeman H. Owens
BY
ATTORNEYS Patented Jan. 8, 1929.

1,698,105

UNITED STATES PATENT OFFICE.

FREEMAN H. OWENS, OF NEW YORK, N. Y.

MOTION-PICTURE APPARATUS.

Application filed December 24, 1925. Serial No. 77,498.

This invention relates to motion picture apparatus, and relates more particularly to motion picture apparatus especially adapted for use with film having a plurality of series of images, of which the images of one series are arranged in alternation with the images of another series.

A principal object of the invention comprehends the provision of motion picture apparatus embodying an improvement of the apparatus disclosed in my Patent No. 1,563,394 of Dec. 1, 1925, adapted especially for use with film having plural rows of images embodying means for intermittently moving the film in either of opposite directions, said means being designed and constructed to expose one series of images when the film is moved in one direction and to expose the other series of images when the film is moved in the opposite direction.

More specifically, the principal object of the invention comprehends the provision of a motion picture apparatus for use with film having a plurality of series of images arranged in longitudinal alinement, with the images of one series arranged in alternation with the images of another series embodying means operable for intermittently moving the film in one or the opposite direction two image spaces at a time to expose consecutively the images of one or of the other image series, which means is operable to cause one image series to be exposed when the film is moved in one direction, and the other image series to be exposed when the film is moved in the opposite direction, whereby the same film can be moved endlessly by changing the direction of movement of the film without the employment of means for laterally or otherwise shifting either the film moving mechanism or the film and its guiding parts.

A still further object of the present invention comprehends the provision of a motion picture apparatus of the character abovementioned, in which the film may be framed for movement in either of its directions of movement, and more specifically, in which such framing means is made a part of the means for predetermining the operation of the film to expose the plural series of images thereon.

A still further important object of the invention includes the production of a motion picture apparatus of the character referred to adapted for continuous projection of pictures on a non-endless film which may be manufactured and sold economically, the apparatus being of simple construction and embodying operating instrumentalities which are positive of action and of such design as to permit the manufacture of motion picture apparatus in the form of toys or the like.

To the accomplishment of the foregoing and such other objects as may hereinafter appear, my invention consists in the elements and their relation one to the other, as hereinafter more particularly described and sought to be defined in the claims; reference being had to the accompanying drawings, which show the preferred embodiments of my invention, and in which:

Fig. 1 is a view showing the operating parts of the motion picture machine embodying the principles of my present invention, Fig. 2 is a fragmentary side elevational view thereof taken in cross-section in the planes of the broken line 2—2, Fig. 1, Fig. 3 is a view of a modification thereof, and Fig. 4 is a view of the type of film employed for taking or projecting images in a motion picture apparatus of the invention.

Referring first to Fig. 4 of the drawings, I show schematically the type of film employed for use in motion picture apparatus of the present invention, the said film comprising a film element 10 having the usual film feed apertures 11, the said film element having a plurality such as a pair of series of images designated respectively A, A', $A^2$ and $A^3$ for one series, and B, B' etc. for the second series, the images of series A being arranged in alternation with the images of series B, as clearly shown in Fig. 4 of the drawings, the images constituting the series of the first pair being arranged sequentially for film running in one direction, and the images of the series constituting the second pair being arranged for film running in the opposite direction, as indicated by the exponents 1, 2 and 3 of the designations of the images.

Referring now to Figs. 1 and 2 of the drawings, I show one embodiment of the invention for operating the film of Fig. 4, so that the first series of images A, A' etc. will be exposed for taking or projecting purposes when the film is moved in one direction, and so that the second series of images B, B' etc., will be exposed for taking or projecting purposes when the film is moved in the opposite direction. As shown, the apparatus for accomplishing the desired result comprises a film exposure window 12 and a pair of intermittent film feeding devices generally designated as 13 and 14 respectively arranged on opposite sides of said window and operative together for moving the film in either of opposite directions, combined with means generally designated as 15 and 16 also arranged on opposite sides of the window 12 and cooperating with the devices 13 and 14 to effect the selection of the image series to be projected depending upon the direction of movement of the film.

The intermittent film feeding devices 13 and 14 are constructed so that they may be operated to move the film in either direction, and in the present preferred embodiment of the invention, these film feeding devices are of the Geneva gear type. More specifically, the film feeding mechanism 13 comprises a sprocket wheel 17 fixed to a shaft 18, which shaft carries a star wheel 19 with which cooperates a pin wheel 20 fixed to a driving shaft 21. Similarly, the film feeding mechanism 14 comprises a sprocket wheel 22 fixed to a shaft 23, which shaft carries a star wheel 24 with which cooperates the pin wheel 20, the pins 25 and 26 for the star wheels 19 and 24 being arranged on opposite sides of the pin wheel so that each pin operates only one star wheel during each rotation of the shaft 21. Cooperating with the star wheels 19 and 24, I provide the usual cam disks 27 and 28 respectively.

The means which effect the selection of the image series to be projected, depending upon the direction of operation of the film, which I have generally designated as 15 and 16 heretofore mentioned, comprises a pair of guide elements for the film 10; and the preferred form of construction comprises a pair of guide and presser rolls, one for each of the sprocket wheels 17 and 22. More specifically, the means 15 comprises a movable arm 30 pivoted at one end 31 and provided at its other end with a guide and presser roll 32 cooperating with the sprocket wheel 17 for guiding and holding the film 10 therebetween; and the means 16 similarly comprises an arm 33 pivoted at one end, as at 34 and provided at its other end with a presser roll 35 cooperating with the sprocket wheel 22 for guiding therebetween the lower end of the film 10.

For moving the film 10 with a double image shift in either of opposite directions, the film feeding devices 13 and 14 are constructed so that a fourth of a revolution of the sprocket wheels 17 and 22 will move the film the length of two image spaces. It will therefore be apparent that operation of the shaft 21 in a clockwise direction, as viewed in Fig. 1, will move the film 10 from the lower to the upper magazine (not shown) of the motion picture apparatus with a double image shaft, this movement of the film being indicated by the arrows in Fig. 1 of the drawings adjacent the full-line representation of the film. The apparatus is shown in Fig. 1 in the position immediately preceding a film shift. For accomplishing the intended results, the film 10 is first threaded in the machine so that a loop L is produced or provided for in the film between the exposure window 12 and one of the film moving devices such as 14, and to carry out the intended object, the loop is made equal in length to an odd number of image spaces, such, for example, as one or three. With this arrangement, with the film moving upwardly the same will be in lying engagement with the upper presser roll 32 and be removed from the lower presser roll 35 by the loop L.

Upon reverse operation of the film moving mechanism, it will now be seen that the loop L will be shifted from its lower position to an upper position between the film exposure window 12 and the upper film moving mechanism 13, producing a loop L' and causing the loop L to disappear; and since the length of the loop is equal to an odd number of image spaces, it will be evident that the film feeding devices will first take up the loop and then move the film so that if one image series is exposed when the film is moved in the first direction, the second or other image series will be exposed when the film is moved in the opposite direction. More specifically, if the shaft 21 as viewed in Fig. 1 is now moved counterclockwise as shown by the arrow in said figure, the lower film sprocket during its next rotation for a quarter of a revolution will first take up the loop L and then move the film 10 downwardly one image space in lieu of two, while the upper film sprocket 17 will move out two image spaces of the film, producing a loop L' equal to the length of one image space. It will be evident that upon reversing the operation of the mechanism to move the film in the original direction, the same sequence of operation will take place to then re-expose the first series of images.

As heretofore stated, a further object of the invention resides in the provision of means for framing the film 10 in either direction of movement, said means being preferably made a part of the mechanism for predetermining the movement of the film so as to produce a simplicity of construction. The framing means comprises the arms 30 and 33 which carry the guide and presser rolls 32 and 35, the said arms being adjustable by means of set screw devices 36 and 36 respectively cooperating with the limiting stops 38 and 39 respectively, the arms 30 and 33 being held against the stops by means of an expansion spring 40 which joins the two arms 30 and 33, as clearly shown in Fig. 1 of the drawings. It will be evident that adjustment of the arm 33 will frame the film for the down-running movement of the same, and adjustment of the arm 30 will frame the film for the up movement of the same.

In Fig. 3 I show a modification of the invention in which the pin wheels are arranged to operate the star wheels successively instead of simultaneously, the apparatus being otherwise the same as that shown in Fig. 1, and being designated by primed similar reference characters. In both embodiments of the invention, I may provide additional guide and presser rolls for the film, such as the presser roll devices 41 and 42, Fig. 1, and 41' and 42', Fig. 3.

The operation of the motion picture apparatus and film feeding mechanism therefor embodying the principles of my present invention will in the main be fully apparent from the above detailed description thereof. It will further be apparent that the film feeding mechanism will operate to expose the plural series of images on a film such as shown in Fig. 4, in which the images are arranged in longitudinal alignment, by first exposing one series with the film moved in one direction and then exposing the other series with the film moved in the opposite direction. It will be further apparent that the film operating mechanism may be fixed in the framework of the machine, and that the plural series of images may be exposed without transversely shifting either the film or the film moving mechanism, as was found necessary in prior devices to accomplish the intended results. It will be further apparent that a direct drive for the film moving in either of opposite directions is produced, and the means is so constructed that the film may be readily framed by simple adjustments for both forward and reverse running. Other and many advantages of the construction provided will be evident to those skilled in the art from the foregoing description of construction and operation.

While I have shown my invention in the preferred forms, it will be apparent that many changes and modifications may be made in the structure disclosed without departing from the spirit of the invention, defined in the following claims.

I claim:

1. A motion picture apparatus for use with film having a plurality of series of images of which the images of one series are arranged in alternation with the images of the other series, comprising, a film exposure window, a pair of intermittent film feeding devices arranged on opposite sides of said window and operative together for moving the film with a plural image shift in either of opposite directions, and means arranged to cooperate with said devices when a predetermined loop having an effective length of at least one image shift is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction.

2. A motion picture apparatus for use with film having a plurality of series of images of which the images of one series are arranged in alternation with the images of the other series, comprising, a film exposure window, a pair of intermittent film feeding devices arranged on opposite sides of said window and operative together for moving the film with a double image shift in either of opposite directions, and means arranged to cooperate with said devices when a loop equal in length to an odd number of image spaces is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction.

3. A motion picture apparatus for use with film having a plurality of series of images of which the images of one series are arranged in alternation with the images of the other series, comprising, a film exposure window, a pair of Geneva gear intermittent film feeding devices arranged on opposite sides of said window and operative together for moving the film with a plural image shift in either of opposite directions, and means arranged to cooperate with said devices when a predetermined loop having an effective length of at least one image shift is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction.

4. A motion picture apparatus for use with film having a plurality of series of images of which the images of one series are arranged in alternation with the images of the other series, comprising, a film exposure window, a pair of intermittent film feeding devices arranged on opposite sides of said window and operative together for moving the film with a double image shift in either of opposite directions, and a pair of guide elements also arranged on opposite sides of said window to cooperate with said devices when a predetermined loop equal in length to an odd number of image spaces is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction.

5. A motion picture apparatus for use with film having a plurality of series of images of which the images of one series are arranged in alternation with the images of the other series, comprising, a film exposure window, a pair of Geneva gear intermittent film feeding devices arranged on opposite sides of said window and operative together for moving the film with a double image shift in either of opposite directions, and a pair of guide and presser rolls spaced on opposite sides of said window and cooperating with said devices when a predetermined loop equal in length to an odd number of image spaces is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction.

6. A motion picture apparatus for use with film having a plurality of series of images of which the images of one series are arranged in alternation with the images of the other series, comprising, a film exposure window, a pair of intermittent film feeding devices arranged on opposite sides of said window and operative together for moving the film with a plural image shift in either of opposite directions, and means arranged to cooperate with said devices when a predetermined loop having an effective length of at least one image shift is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction, said means being adjustable for framing the film at said exposure window.

7. A motion picture apparatus for use with film having a plurality of series of images of which the images of one series are arranged in alternation with the images of the other series, comprising, a film exposure window, a pair of intermittent film feeding devices arranged on opposite sides of said window and operative together for moving the film with a plural image shift in either of opposite directions, and a pair of guide elements also arranged on opposite sides of said window to cooperate with said devices when a predetermined loop having an effective length of at least one image shift is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction, and means for adjusting each of said guide elements for framing the film for both directions of movement.

8. A motion picture apparatus for use with film having a plurality of series of images of which the images of one series are arranged in alternation with the images of the other series, comprising, a film exposure window, a pair of Geneva gear intermittent film feeding devices arranged on opposite sides of said window and operative together for moving the film with a plural image shift in either of opposite directions, and a pair of adjustable guide and presser rolls spaced on opposite sides of said window and cooperating with said devices when a predetermined loop equal in length to an odd number of image spaces is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction, a resilient element joining said guide and presser rolls and set screw means for independently adjusting said guide and presser rolls for framing said film.

9. A motion picture apparatus for use with film having a plurality of series of images of which the images of one series are arranged in alternation with the images of the other series, comprising, a film exposure window, a pair of intermittent film feeding devices arranged on opposite sides of said window and operative together but at spaced time intervals in each cycle for moving the film with a plural image shift in either of opposite directions, and means arranged to cooperate with said devices when a predetermined loop having an effective length of at least one image shift is produced in the film between the window and one of said devices with the film moving in one direction for shifting said loop to a position between the window and the other of said devices when the film is moved in the opposite direction, whereby one image series will be exposed when the devices are operated in one direction and the other image series will be exposed when the devices are operated in the reverse direction.

Signed at New York city, in the county of New York and State of New York, this 17th day of Dec., A. D. 1925.

FREEMAN H. OWENS.